(12) United States Patent
Cislo et al.

(10) Patent No.: US 9,546,682 B2
(45) Date of Patent: Jan. 17, 2017

(54) CAGE OF A ROLLING BEARING, ROLLING BEARING COMPRISING SUCH A CAGE AND APPARATUS COMPRISING SUCH A ROLLING BEARING

(71) Applicants: Lawrence E Cislo, Brighton, MI (US); Riccardo Restivo, Turin (IT); Thierry Poulle, Neuvy le Roi (FR)

(72) Inventors: Lawrence E Cislo, Brighton, MI (US); Riccardo Restivo, Turin (IT); Thierry Poulle, Neuvy le Roi (FR)

(73) Assignee: AKTIEBOLAGET SKF, Goteborg (SE)

( * ) Notice: Subject to any disclaimer, the term of this patent is extended or adjusted under 35 U.S.C. 154(b) by 0 days.

(21) Appl. No.: 14/564,141

(22) Filed: Dec. 9, 2014

(65) Prior Publication Data

US 2016/0160921 A1    Jun. 9, 2016

(51) Int. Cl.
| | | |
|---|---|---|
| *F16C 33/41* | (2006.01) | |
| *F16C 33/38* | (2006.01) | |
| *F16C 19/06* | (2006.01) | |
| *F16C 33/66* | (2006.01) | |

(52) U.S. Cl.
CPC ........... *F16C 33/418* (2013.01); *F16C 33/416* (2013.01); *F16C 33/6614* (2013.01); *F16C 19/06* (2013.01); *F16C 2240/30* (2013.01)

(58) Field of Classification Search
CPC ....... F16C 33/41; F16C 33/412; F16C 33/414; F16C 33/416; F16C 33/418; F16C 19/06; F16C 33/3887; F16C 33/3856; F16C 33/6614; F16C 2240/30
See application file for complete search history.

(56) References Cited

U.S. PATENT DOCUMENTS

| | | | | |
|---|---|---|---|---|
| 1,958,025 | A * | 5/1934 | Styri ......................... | C21D 9/40 148/580 |
| 3,649,094 | A * | 3/1972 | Russell .................. | F16C 19/163 384/533 |
| 3,918,778 | A * | 11/1975 | Jacobson ............... | F16C 19/163 384/447 |
| 4,040,686 | A * | 8/1977 | F'Geppert ............... | F16C 19/06 384/527 |

(Continued)

FOREIGN PATENT DOCUMENTS

JP          3652396 B2 *  5/2005   ......... B29C 45/0025

*Primary Examiner* — Alan B Waits
(74) *Attorney, Agent, or Firm* — Bryan Peckjian; SKF USA Inc. Patent Dept.

(57) ABSTRACT

A cage of a rolling bearing, the cage comprising: an annular heel centered on a central axis and having a constant radial thickness measured radially to the central axis; an axial portion extending from the heel substantially parallel to the central axis; and pockets delimited by the heel and the axial portion for receiving rolling elements. The axial portion has an axial length being greater than half the inner diameter of the pockets and an outside diameter being lesser than the outside diameter of the heel and which comprises between a first value equal to the pitch circle diameter of the cage minus half the radial thickness of the heel and a second value equal to the pitch circle diameter of the cage plus half the radial thickness of the heel. The pockets are spaced around the central axis having angular spacings being at least partly different from one another.

10 Claims, 5 Drawing Sheets

(56) References Cited

U.S. PATENT DOCUMENTS

| | | | | |
|---|---|---|---|---|
| 5,941,704 | A * | 8/1999 | Arai | A61C 1/181 |
| | | | | 384/523 |
| 6,102,822 | A * | 8/2000 | Nakazeki | F16C 13/006 |
| | | | | 384/523 |
| 6,261,004 | B1 * | 7/2001 | Tsujimoto | F16C 19/386 |
| | | | | 384/571 |
| 6,533,462 | B2 * | 3/2003 | Kawakami | F16C 33/414 |
| | | | | 384/470 |
| 8,157,449 | B2 * | 4/2012 | Doyer | F16C 33/416 |
| | | | | 384/470 |
| 8,454,240 | B2 * | 6/2013 | Doyer | F16C 33/416 |
| | | | | 384/470 |
| 8,568,035 | B2 * | 10/2013 | Claude | F16C 33/414 |
| | | | | 384/531 |
| 8,894,290 | B2 * | 11/2014 | Mola | F16C 33/3887 |
| | | | | 384/523 |
| 8,920,038 | B2 * | 12/2014 | Varnoux | F16C 33/3887 |
| | | | | 384/523 |
| 2011/0299805 | A1 * | 12/2011 | Damato | F16C 19/163 |
| | | | | 384/531 |
| 2012/0183248 | A1 * | 7/2012 | Fujiwara | B22D 17/22 |
| | | | | 384/527 |

* cited by examiner

CAGE OF A ROLLING BEARING, ROLLING BEARING COMPRISING SUCH A CAGE AND APPARATUS COMPRISING SUCH A ROLLING BEARING

TECHNICAL FIELD OF THE INVENTION

The invention concerns a cage for retaining rolling elements of a rolling bearing. The invention also concerns a rolling bearing comprising such a cage. The invention also concerns an apparatus comprising such a rolling bearing. The field of the invention is that of rolling bearing cages, particularly synthetic cages used in deep-groove ball bearings to provide a suitable circumferential spacing between the balls.

BACKGROUND OF THE INVENTION

In a known manner, a rolling bearing comprises an inner ring, an outer ring, and one or several rows of rolling elements. For each row, the rolling bearing further comprises a cage retaining the rolling elements.

US-A-2010 046 875 discloses an example of such a cage, comprising an annular heel, an axial portion and pockets for receiving rolling elements, more precisely balls. The pockets are delimited by the annular heel and the axial portion. The pockets are regularly spaced around the central axis of the cage. The axial portion has an outside diameter inferior to the outside diameter of the heel. The axial portion is thus lightened, its radial thickness being reduced in comparison with that of the heel, thus leading to a reduction in the cost of the raw material of the cage, in the mass and in the inertia of the cage. Thanks to this lightening, the cage deforms to a lesser extent at high speed, thus reducing cage and ball wear.

However, when the pockets are regularly spaced around the central axis of the cage, at a given rotation speed of the rolling bearing, the balls pass on the same locations at the same frequency, thus increasing wear of raceways of the bearing. Moreover, if this frequency comes into resonance with a natural frequency of the bearing or of other bodies to which the bearing is fixed, an undesired noise is likely to be generated, progressively increasing, and becoming unacceptable in certain cases.

SUMMARY OF THE INVENTION

The aim of the invention is to provide an improved cage for a rolling bearing.

To this end, the invention concerns a cage of a rolling bearing, the cage comprising: an annular heel centered on a central axis and having a constant radial thickness measured radially to the central axis; an axial portion extending from the heel substantially parallel to the central axis; and pockets delimited by the heel and the axial portion for receiving rolling elements of the rolling bearing; the axial portion having an axial length which is greater than half the inner diameter of the pockets and an outside diameter which is lesser than the outside diameter of the heel and which is comprised between a first value equal to the pitch circle diameter of the cage minus half the radial thickness of the heel and a second value equal to the pitch circle diameter of the cage plus half the radial thickness of the heel. According to the invention, the pockets are spaced around the central axis according to respective values of angular spacings which are at least partly different from one another.

Thus, the rolling bearing equipped with a cage according to the invention is energy efficient and hoot noise is prevented. The invention allows eliminating the negative phenomena associated with imbalances of forces and pressure peaks, while providing quietness and absence of resonance. The noise reduction is highly improved in comparison with known cages. The cage is more efficient by decreasing the friction (contact with the heel only) and reducing inertia (less material). Another advantage of the cage is to limit the wear and then to increase its lifetime in service.

According to further aspects of the invention which are advantageous but not compulsory, such a cage may incorporate one or several of the following features:

- The majority of the pockets are spaced around the central axis according to respective values of angular spacings which are different from one another.
- The cage includes a total of eight pockets.
- The eight pockets are spaced around the central axis according to respective values of angular spacings which are equal for two spacings and which are different for the six other spacings.
- The two spacings having equal values are not contiguous spacings in a circumferential direction along the cage.
- The eight pockets are spaced from one another according to the following values of the angular spacings between two consecutive pockets: 41 degrees, 41.5 degrees, 41.5 degrees, 45.3 degrees, 45.7 degrees, 47.5 degrees, 48.4 degrees, 49.1 degrees.
- In a circumferential direction along the cage, the eight pockets are spaced from one another according to the following sequence of angular spacings between two consecutive pockets: 41.5 degrees, 49.1 degrees, 41 degrees, 47.5 degrees, 45.7 degrees, 41.5 degrees, 45.3 degrees, 48.4 degrees.
- The outside diameter of the axial portion is equal to the pitch circle diameter of the cage.
- The axial portion comprises several axial parts delimiting the pockets and including cavities opened radially opposite the central axis, the heel including openings intercommunicating with the cavities and extending axially between the cavities and a face of the heel opposite the axial portion, the openings and cavities having different dimensions depending on their position around the central axis. The cavities increase the efficiency of the cage by enabling its deformation.
- The openings and the cavities are angularly positioned at generally equal distances between the pockets.
- On a face of the heel opposite the axial portion, the openings are separated by junctions having a thickness, in a circumferential direction, which is lesser than one eighth of the radial thickness of the heel.
- The axial portion comprises several axial parts, each including: two arcuate branches delimiting adjacent pockets, and ribs connecting the two arcuate branches and provided with axial stubs.
- The axial portion extends axially over a length at least equal to 60% of the diameter of the pockets.
- The cage comprises arcuate connecting portions between the heel and the axial portion, said connecting portions extending axially over a length lesser than the length of the axial portion.
- The axial portion includes a plurality of inter-pocket axial parts, each axial part including two branches delimiting the pockets and connected to the heel, a rib connecting the branches and located between the heel and free ends of the branches, and a partition having a radial thickness less than the radial thickness of the branches and positioned between the branches, the rib and the heel.

The heel and the axial portion are formed of at least one of glass-fiber filled polyamide and polyether-ether-ketone.

The invention also concerns a rolling bearing, comprising an inner ring, an outer ring, a cage as mentioned here-above, and rolling elements mounted in the pockets of the cage.

According to further aspects of the invention which are advantageous but not compulsory, such a bearing may incorporate one or several of the following features:

The rolling bearing is a ball rolling bearing and the rolling elements are balls.

The balls have a diameter comprised between 6.7 and 6.8 millimeters.

The rolling bearing comprises one cage retaining one row of rolling elements.

The rolling bearing comprises two cages retaining two rows of rolling elements.

The invention also concerns an apparatus comprising a rolling bearing as mentioned here-above. For example, the apparatus can be an alternator, a propeller shaft assembly or the timing drive of an engine.

BRIEF DESCRIPTION OF THE DRAWINGS

The invention will now be explained in correspondence with the annexed figures, and as an illustrative example, without restricting the object of the invention. In the annexed figures.

DETAILED DESCRIPTION OF SOME EMBODIMENTS

Figure 1:
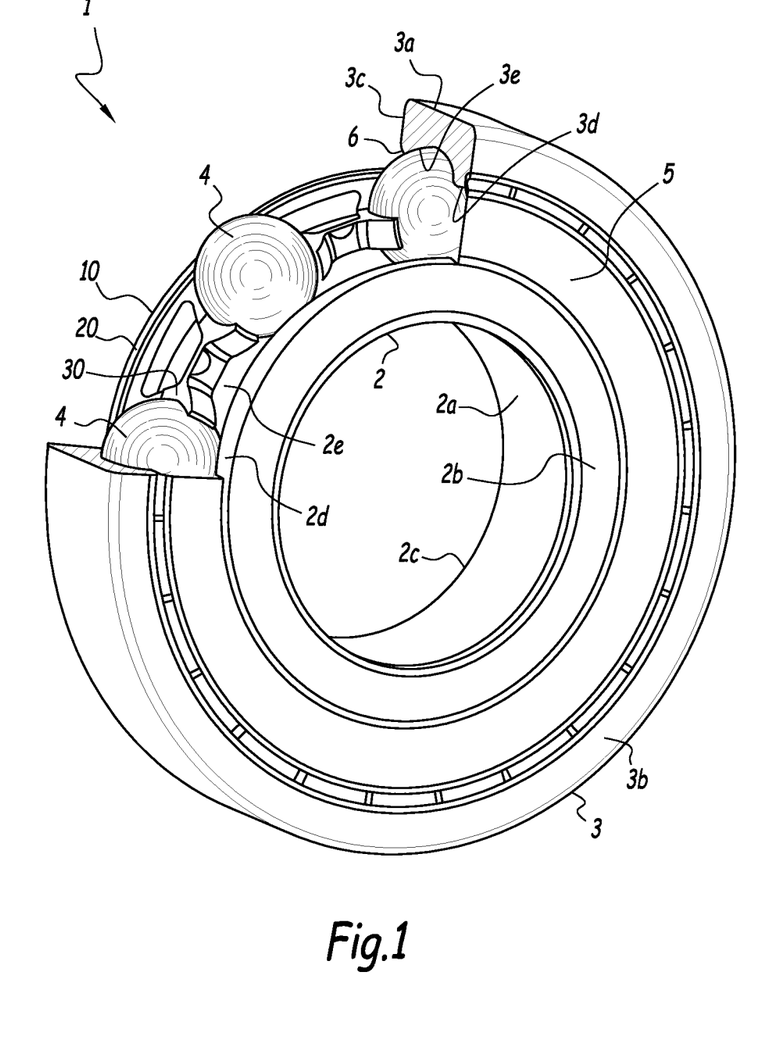
FIG. 1 is an exploded perspective view of a rolling bearing according to the invention, comprising an inner ring, an outer ring, a row of balls and a cage for retaining the balls.
Figure 2:
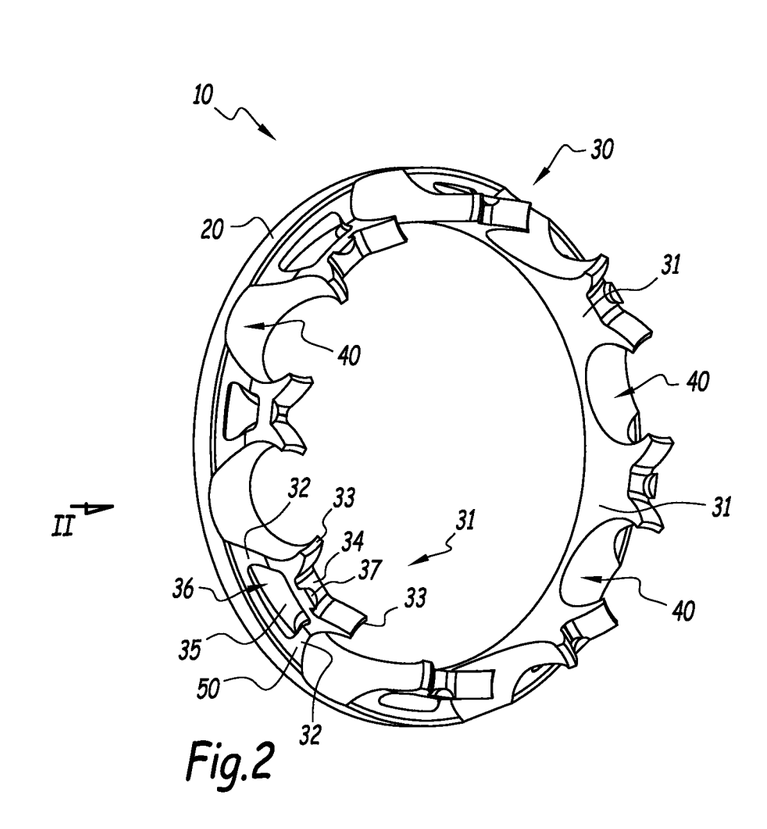
FIGS. 2 and 3 are perspective views of one cage of FIG. 1.
Figure 3:
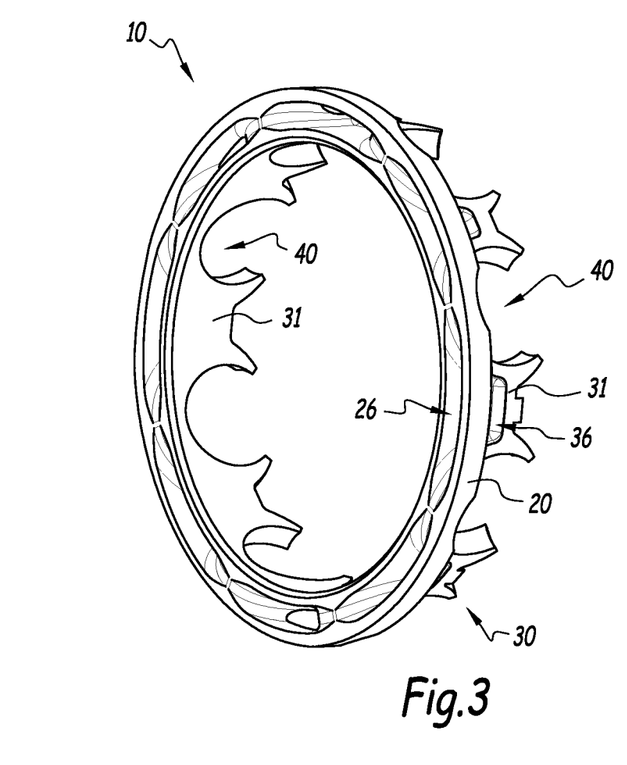
Figure 4:
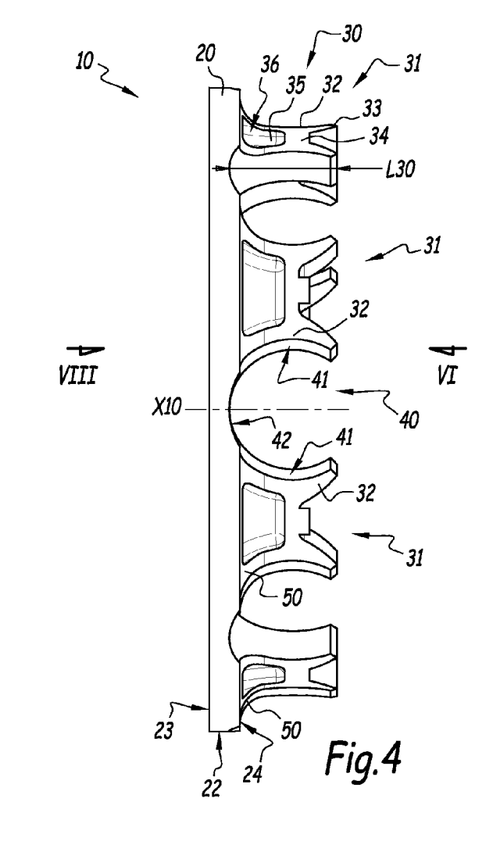
FIG. 4 is a side view of the cage along arrow IV on FIG. 2.

FIG. 1 shows a rolling bearing 1 according to the invention. The rolling bearing 1 comprises an inner ring 2, an outer ring 3, a row of balls 4, sealing plates 5 and 6, and a cage 10 also according to the invention. Inner ring 2 comprises a cylindrical inner bore 2a, two opposed radial lateral surfaces 2b and 2c and a cylindrical exterior surface 2d from which a raceway 2e is formed for the rolling elements 4. Outer ring 3 comprises a cylindrical exterior surface 3a, opposed radial lateral surfaces 3b and 3c, and a cylindrical inner bore 3d from which a raceway 3e is formed for the rolling elements 4. Sealing plates 5 and 6 are fastened to grooves formed in outer ring 3, near lateral surfaces 3b and 3c, respectively.

FIGS. 2 to 8 show the cage 10, which is designed for retaining balls 4 and for maintaining the circumferential spacing between these balls 4. Cage 10 comprises an annular heel 20 centered on a central axis X10. Cage 10 also comprises an axial portion 30 extending from heel 20 substantially parallel to axis X10. More precisely, axial portion 30 comprises eight axial parts 31 distributed around axis 10. Heel 20 and axial portion 30 define eight pockets 40 of spherical shape for receiving the rolling elements 4. Heel 20 has a radial thickness T20 defined radially to axis X10 and an axial length L20 defined parallel to axis X10. Axial portion 30 has an axial length L30 defined parallel to axis X10. Pockets 40 have an inner diameter D40. Length L30 is at least equal to half the diameter D40 of the pockets 40, so that the rolling elements 4 can be suitably retained in said pockets 40. In the example of the figures, thickness T20, lengths L20 and L30, and diameter D40 are respectively equal to 3.05, 1.5, 5.7 and 6.75 millimeters.

Cage 10 has an inside diameter D10 which is constant along axis X10, on both heel 20 and axial portion 30, except at an inner chamfer 25 formed on heel 20. As an alternative, it is possible to have a heel 20 that has an inside diameter that differs slightly from that of the axial portion 30. Cage 10 has an outside diameter different for the heel, having an outside diameter D20, and for the axial portion, having an outside diameter D30. Outside diameter D20 is greater than outside diameter D30. In the example of the figures, diameters D10, D20 and D30 are respectively equal to 25.4, 31.5 and 28.47 millimeters.

Figure 5:
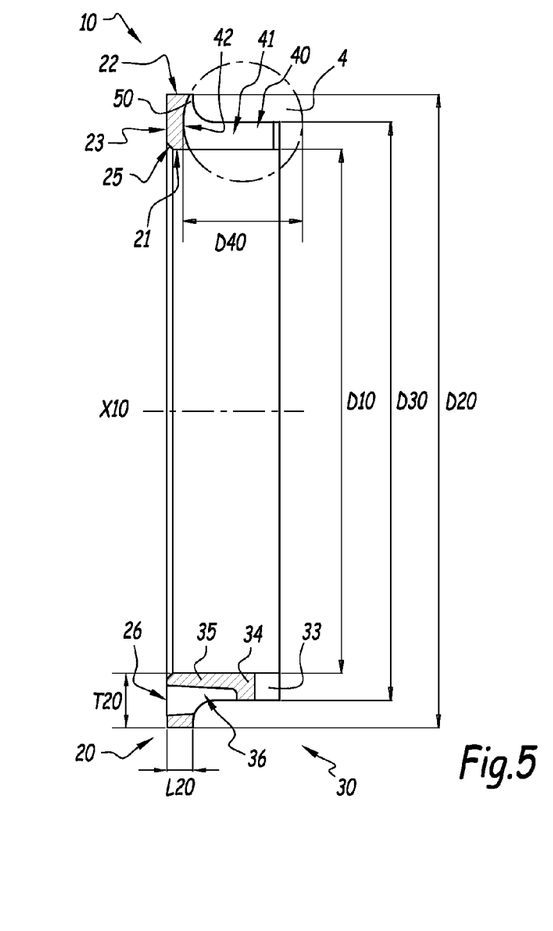
FIG. 5 is a sectional view along lines V-V on FIG. 6.

In the example of the figures, as particularly shown on FIG. 5, outside diameter D30 is equal to the pitch circle diameter of cage 10, which is the diameter of the imaginary circle passing through the center of the imaginary spheres defining the pockets 40. The pitch circle diameter of cage 10 is substantially equal to the pitch circle diameter of bearing 1, that is to say the diameter of the imaginary circle joining the centers of balls 4.

Alternatively, outside diameter D30 can be chosen somewhere in the range defined between the pitch circle diameter of the cage 10 minus half the radial thickness T20 of the heel 20, and the pitch circle diameter of the cage 10 plus half the radial thickness T20 of the heel 20.

Between two adjacent pockets 40, an axial part 31 forms a protrusion extending from heel 20 substantially parallel to axis X10. Axial part 31 comprises two arcuate branches 32, each ending in a claw 33 axially opposite the heel 20. Axial part 31 also comprises a rib 34 connecting the ends of the two branches 32 at the opposite end to the heel 20. Claws 33 extend beyond rib 34 opposite heel 20. Preferably, branches 32, claws 33 and rib 34 have the same radial thickness. Each rib 34 is provided with a stud 37 extending axially opposite heel 20. Stud 37 has a plane exterior surface and a curved interior surface.

Axial part 31 also comprises arcuate partitions 35 connecting two branches 32 between two adjacent pockets 40. Each partition 35 has a small radial thickness, for example less than half the radial thickness of the branches 32, and extends axially between heel 20 and rib 34. Partition 35 is positioned on the internal face of axial part 31 and leaves a cavity 36 on the external face of axial part 31. More precisely, cavity 36 extends axially between heel 20 and rib 34, circumferentially between the two branches 32 of axial part 31 and radially between partition 35 and the external face of axial part 31. As shown on FIG. 7, branches 32 have a curvature radius different inside pocket 40 and inside cavity 36. Similarly, claws 33 have a curvature radius different inside pocket 40 and outside pocket 40, near stubs 37.

Heel 20 comprises a cylindrical bore 21, an exterior cylindrical surface 22, a rear annular face 23 and a front annular face 24 from which the axial portion 30 extends substantially parallel to axis X10. Chamfer 25 is formed between bore 21 and face 23.

Openings 26 are formed in heel 20 and extend axially between face 23 and cavities 36. Openings 26 and cavities 36 thus intercommunicate, making cage 10 easier to manufacture, for example by molding. Furthermore, the presence of openings 26 and cavities 36 encourages the flow of lubricant within bearing 1. Openings 26 are radially delimited in such a way as to leave part of the heel 20 on the inside and another part of the heel 20 on the outside. As shown on FIGS. 7 and 8, cavities 36 enlarge in a circumferential direction up to openings 26. Openings 26 and cavities 36 are angularly positioned at generally equal distances between pockets 40. Besides, for each axial part 31, openings 26 and cavities 36 have different dimensions. Adjacent openings 26 are separated by narrow junctions 27 formed on face 23 of heel 20. Each junction 27 has a thickness T27, defined in the circumferential direction, which is lesser than one eighth of the radial thickness T20 of heel 20.

Thanks to the reduction in the outer diameter D30 of the axial portion 30 and to the presence of openings 26 and cavities 36 within cage 10, the amount of material needed to form cage 10 is reduced, leading to a reduction in raw material cost and to a reduction in mass. Thus, the radial deformation of cage 10 induced by high speed rotation is reduced. Furthermore, the particular shape of axial parts 31, with branches 32 forming stiffening ribs and partitions 35 increasing the rigidity on the inner side of the axial part 31 (that experiences tensile axial stress as the entire axial part 31 undergoes flexural radial deformation), also reduces that deformation of axial portion 30 in operation. Heel 20 remains relatively non-deformable in the radial direction as a result of its annular structure.

Cage 10 also comprises exterior arcuate connecting portions 50 connecting the heel 20 and the axial portion 30. Connecting portions 50 are located at the base of each axial part 31 and extend axially over a length lesser than the length of axial portion 30. Each connecting portion 50 forms an interface between heel 20 and branches 32. Connecting portions 50 in cross section in a plane including axis X10 each have a rounded profile, with a radial thickness that decreases from heel 20 toward branches 32. Alternatively, connection portions 50 may have different shapes, for example a frustoconical chamfer shape.

Each pocket 40 is delimited by two partially spherical concave surfaces 41 formed on the opposed arcuate branches 32 of adjacent axial parts 31 and a partially spherical concave surface 42 formed on heel 20. Surfaces 41 and 42 prolong each other and define together spherical shaped cavities forming the pockets 40, capable of restraining balls 4 suitably spaced around axis X10. The concave surfaces 41 and 42 of each pocket 40 cover together an arc which extends for more than 180 degrees around each ball 4. Indeed, axial length L30 of axial portion 30 is greater than half the inner diameter D40 of the pockets 40. Axial length L30 is defined parallel to axis X10 between the center of surface 42 and the end of claws 33, in other words between the bottom of pocket 40 and the end of axial portion 30. Preferably, axial length L30 is at least equal to 60% of diameter D40.

Figure 6:
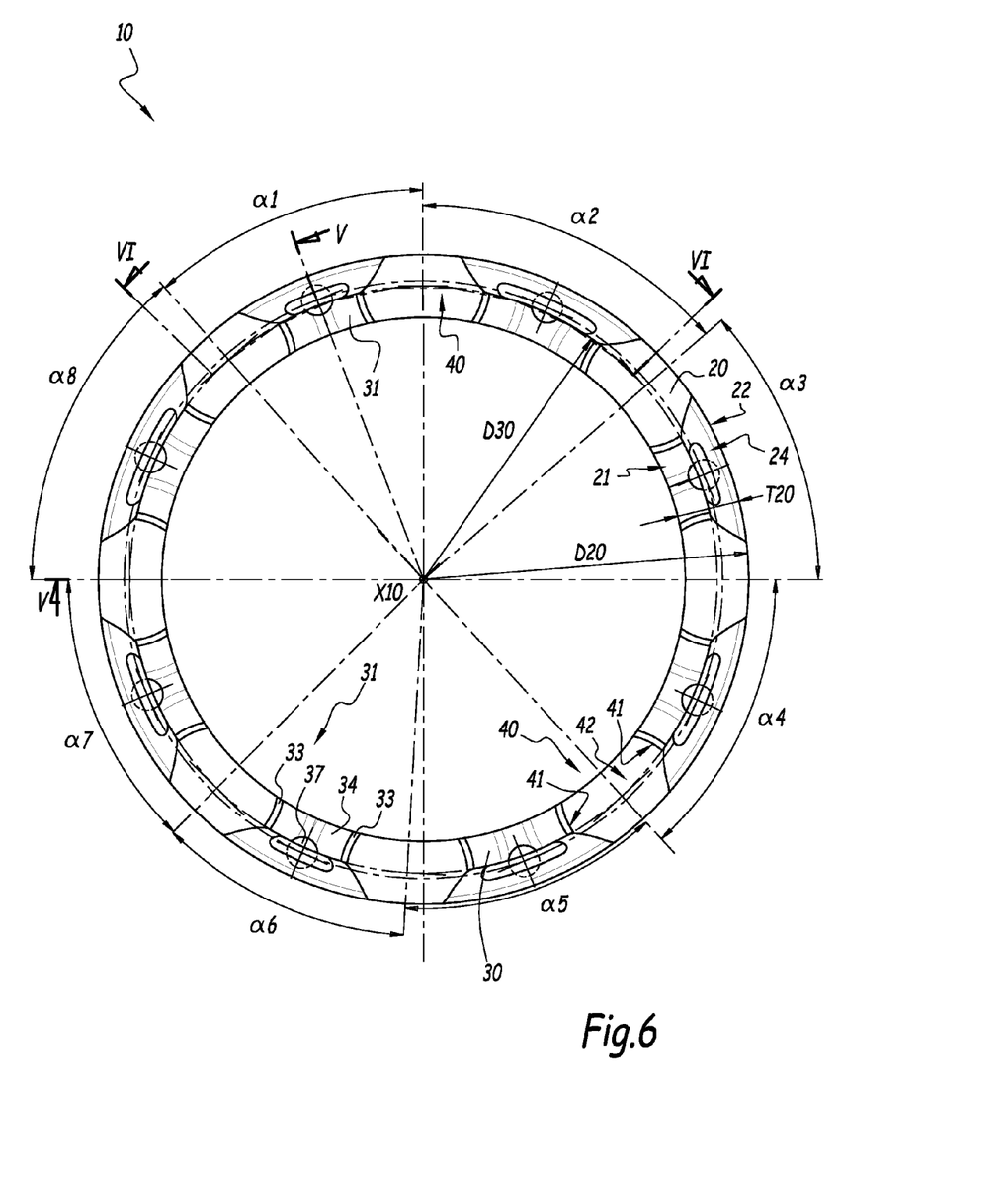
FIG. 6 is a front view of the cage along arrow VI of FIG. 4.
Figure 7:
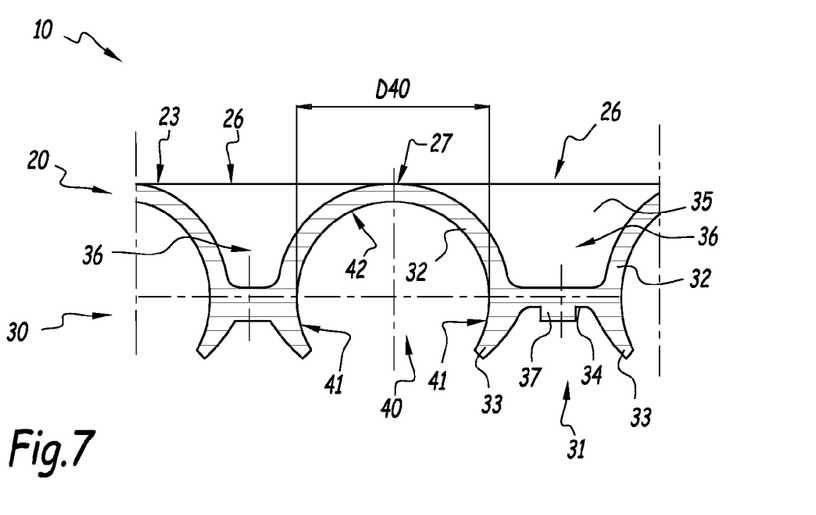
FIG. 7 is a sectional view along curved line VII-VII of FIG. 6.
Figure 8:
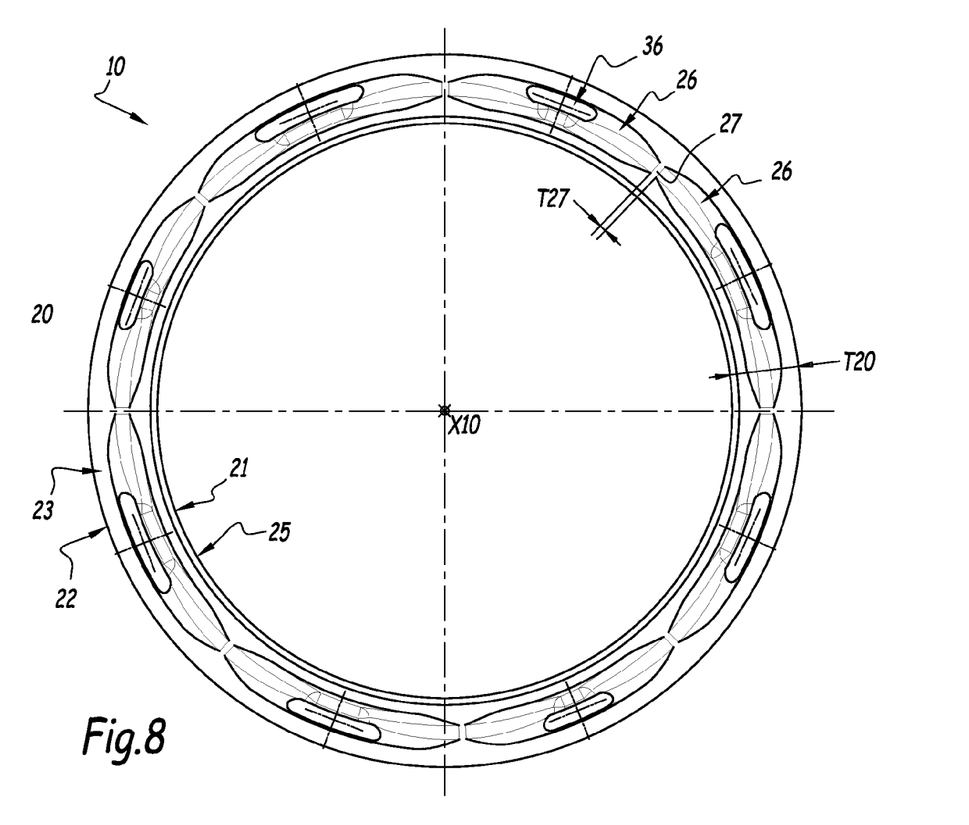
FIG. 8 is a rear view of the cage along arrow VIII of FIG. 4.

As shown on FIG. 6, the angular spacing between two consecutive pockets 40 amongst the eight pockets 40 is defined by eight angles $\alpha1$, $\alpha2$, $\alpha3$, $\alpha4$, $\alpha5$, $\alpha6$, $\alpha7$ and $\alpha8$. This angular spacing is defined around axis X10 between the geometric centers of adjacent pockets 40. The majority of the eight angles $\alpha1$ to $\alpha8$ have different values which entail different and irregular intervals between balls 4 fitted into pockets 40 of cage 10.

In the preferred embodiment shown on the figures, the values for angular spacing between the pockets 40 are as follows: 41 degrees, 41.5 degrees, 41.5 degrees, 45.3 degrees, 45.7 degrees, 47.5 degrees, 48.4 degrees, 49.1 degrees. More precisely, considering the circumferential direction along cage 10, the eight pockets 40 are spaced from each other according to the following sequence of spacing angles:

$\alpha1$=41.5 degrees;
$\alpha2$=49.1 degrees;
$\alpha3$=41 degrees;
$\alpha4$=47.5 degrees;
$\alpha5$=45.7 degrees;
$\alpha6$=41.5 degrees;
$\alpha7$=45.3 degrees;
$\alpha8$=48.4 degrees.

In other words, two spacings have equal values and the six other spacings have different values.

Cage 10 configured according to the invention is particularly advantageous in terms of quietness, absence of resonance and reduction of the alteration in contact loading, in comparison with a traditional bearing with equidistant angular spacing. Cage 10 improves the useful life under load of the rolling bearing 1.

Other non-shown embodiments of rolling bearing 1 and cage 10 can be implemented within the scope of the invention.

According to a non-shown embodiment, bearing 1 can include rolling elements 4 other than balls, by example conical or cylindrical rolling elements. In this case, pockets 40 of cage 10 have a shape which is different from a spherical shape.

According to another non-shown embodiment, bearing 1 can include two rows of rolling elements 4 and two cages 10.

According to another non-shown embodiment, cage 10 may have a different number of pockets, by example seven or nine pockets.

In addition, technical features of the different embodiments can be, in whole or part, combined with each other. Thus, rolling bearing 1 and cage 10 can be adapted to the specific requirements of the application.

The invention claimed is:

1. A cage of a rolling bearing, the cage comprising:
an annular heel centered on a central axis and having a constant radial thickness measured radially to the central axis;
an axial portion extending from the annular heel substantially parallel to the central axis; and
pockets delimited by the annular heel and the axial portion for receiving rolling elements of the rolling bearing;
wherein the axial portion has an axial length which is greater than half an inner diameter of the pockets and an outside diameter which is less than an outside diameter of the annular heel and which is comprised between a first value equal to a pitch circle diameter of the cage minus half the radial thickness of the annular heel and a second value equal to the pitch circle diameter of the cage plus half the radial thickness of the annular heel;
wherein the pockets are spaced around the central axis according to respective values of angular spacings, wherein two of the pockets have angular spacings that are equal to each other and the rest of the pockets each have angular spacings that are not equal to any other pocket, the two pockets that have equal angular spacings are not adjacent to each other such that there is at least one pocket in between the two pockets that have equal angular spacings, and wherein a difference between the smallest angular spacing and the largest angular spacing is at least eight degrees.

2. The cage according to claim 1, wherein the cage includes a total of eight pockets.

3. The cage according to claim 2, wherein the eight pockets are spaced from one another according to the following values of the angular spacings between two consecutive pockets: 41 degrees, 41.5 degrees, 41.5 degrees, 45.3 degrees, 45.7 degrees, 47.5 degrees, 48.4 degrees, 49.1 degrees.

4. The cage according to claim 3, wherein in a circumferential direction along the cage, the eight pockets are spaced from one another according to the following sequence of angular spacings between two consecutive pockets: 41.5 degrees, 49.1 degrees, 41 degrees, 47.5 degrees, 45.7 degrees, 41.5 degrees, 45.3 degrees, 48.4 degrees.

5. The cage according to claim 1, wherein the outside diameter of the axial portion is equal to the pitch circle diameter of the cage.

6. The cage according to claim 1, wherein the axial portion comprises several axial parts delimiting the pockets and including cavities opened radially opposite the central axis, the annular heel including openings intercommunicating with the cavities and extending axially between the cavities and a face of the annular heel opposite the axial portion, the openings and cavities having different dimensions depending on their position around the central axis.

7. The cage according to claim 6, wherein on the face of the annular heel opposite the axial portion, the openings are separated by junctions having a thickness, in a circumferential direction, which is less than one eighth (⅛) of the radial thickness of the annular heel.

8. The cage according to claim 1, wherein the axial portion comprises several axial parts, each including:
two arcuate branches delimiting adjacent pockets, and
a rib connecting the two arcuate branches and provided with an axial stub.

9. A rolling bearing, comprising:
(a) an inner ring,
(b) an outer ring,
(c) a cage comprising:
an annular heel centered on a central axis and having a constant radial thickness measured radially to the central axis,
an axial portion extending from the annular heel substantially parallel to the central axis, and
pockets delimited by the annular heel and the axial portion for receiving rolling elements of the rolling bearing,
wherein the axial portion has an axial length which is greater than half an inner diameter of the pockets and an outside diameter which is less than an outside diameter of the annular heel and which is comprised between a first value equal to a pitch circle diameter of the cage minus half the radial thickness of the annular heel and a second value equal to the pitch circle diameter of the cage plus half the radial thickness of the annular heel,
wherein the pockets are spaced around the central axis according to respective values of angular spacings, wherein two of the pockets have angular spacings that are equal to each other and the rest of the pockets each have angular spacings that are not equal to any other pocket, the two pockets that have equal angular spacings are not adjacent to each other such that there is at least one pocket in between the two pockets that have equal angular spacings, and wherein a difference between the smallest angular spacing and the largest angular spacing is at least eight degrees; and
(d) rolling elements mounted in the pockets of the cage.

10. The rolling bearing according to claim 9, wherein the rolling bearing is integrated into an apparatus.

* * * * *